United States Patent
Yoshino et al.

(10) Patent No.: US 12,515,738 B2
(45) Date of Patent: Jan. 6, 2026

(54) STEERING SYSTEM FOR VEHICLE

(71) Applicant: TOYOTA JIDOSHA KABUSHIKI KAISHA, Toyota (JP)

(72) Inventors: Hayato Yoshino, Miyoshi (JP); Kimiaki Ono, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 18/462,028

(22) Filed: Sep. 6, 2023

(65) Prior Publication Data
US 2024/0199116 A1 Jun. 20, 2024

(30) Foreign Application Priority Data

Dec. 15, 2022 (JP) ................. 2022-200431

(51) Int. Cl.
*B62D 7/15* (2006.01)

(52) U.S. Cl.
CPC ........... *B62D 7/1545* (2013.01); *B62D 7/159* (2013.01)

(58) Field of Classification Search
CPC ...... B62D 7/1545; B62D 7/159; B62D 6/002; B62D 5/0463; B62D 6/008
See application file for complete search history.

(56) References Cited

U.S. PATENT DOCUMENTS

| | | | | |
|---|---|---|---|---|
| 2006/0074541 A1* | 4/2006 | Ono | ................ | B60T 8/172 |
| | | | | 701/80 |
| 2010/0263961 A1 | 10/2010 | Horiuchi | | |
| 2014/0229068 A1 | 8/2014 | Ueyama et al. | | |

(Continued)

FOREIGN PATENT DOCUMENTS

| | | | | |
|---|---|---|---|---|
| CN | 103786602 A | * | 5/2014 | |
| JP | 2009-512094 A | | 3/2009 | |
| JP | 5140662 B2 | | 2/2013 | |
| JP | 2021008197 A | * | 1/2021 | ........... B60T 8/1755 |
| WO | 2007/047605 A2 | | 4/2007 | |
| WO | 2013/030974 A1 | | 3/2013 | |
| WO | 2019/225289 A1 | | 11/2019 | |

OTHER PUBLICATIONS

Machine Translation of JP 2021008197 A PDF File Name: "JP2021008197A_Machine_Translation.pdf" (Year: 2021).*

(Continued)

*Primary Examiner* — Lindsay M Low
*Assistant Examiner* — Ruben Picon-Feliciano
(74) *Attorney, Agent, or Firm* — Sughrue Mion, PLLC

(57) ABSTRACT

A steering system for a vehicle includes: an operation member operable by a driver; a front-wheel steering device to which the operation member is connected to enable a front wheel to be steered by a steering amount; a rear-wheel steering device configured to steer a rear wheel independently of the front wheel; and a controller configured to control the front-wheel and rear-wheel steering devices. The controller executes a front-wheel steering force application control to apply, to the front wheel, a steering force including, as a component thereof, a driving support force that causes the vehicle to travel along a target travel line. The controller determines, in the front-wheel steering force application control, the driving support force based on a target operation amount that is the operation amount of the operation member to cause the vehicle to travel along the target travel line and a steering amount of the rear wheel.

7 Claims, 5 Drawing Sheets

(56) References Cited

U.S. PATENT DOCUMENTS

2021/0129667 A1* 5/2021 Sugawara .......... B60K 23/0808
2021/0253161 A1   8/2021 Yoshida et al.

OTHER PUBLICATIONS

Machine Translation of CN 103786602 A PDF File Name: "CN103786602A_Machine_Translation.pdf" (Year: 2014).*

* cited by examiner

STEERING SYSTEM FOR VEHICLE

REFERENCE TO RELATED APPLICATIONS

This application claims priority from Japanese Patent Application No. 2022-200431 filed on Dec. 15, 2022. The entire content of the priority application is incorporated herein by reference.

BACKGROUND ART

The following disclosure relates to a steering system for a vehicle.

A steering system for a vehicle includes, for instance, a system described in Japanese Patent No. 5140662, namely, a system including a rear-wheel steering device that steers rear wheels independently of front wheels, in addition to a front-wheel steering device to which a steering operation member (hereinafter simply referred to as "operation member" where appropriate) is connected and which includes a drive source. (Such a system will be hereinafter referred to as "four wheel steering system" or "4WS system" where appropriate.) In the four wheel steering system, the drive source of the front-wheel steering device applies an operation assist torque, which assists an operation torque of a driver applied to the operation member, to the front wheels as a steering torque. The operation assist torque is determined based on a steering angle of the rear wheels in consideration of a deterioration in an operation feeling felt by the driver. It is noted that the operation torque, the operation assist torque, the steering torque, the steering angle are each as one example of an operation force, an operation assist force, a steering force, and a steering amount, respectively.

SUMMARY

In recent development of automated driving techniques of vehicles, it is proposed to positively steer the front wheel by a force generated by the drive source of the front-wheel steering device. For instance, it is proposed to apply, to the front wheel, the steering force that causes the vehicle to travel along a travel line that is a target or standard travel line, i.e., a driving support force. The utility of the steering system configured to steer a rear wheel and a front wheel independently of each other can be enhanced by making the driving support force appropriate. Accordingly, an aspect of the present disclosure relates to the steering system with high utility.

In one aspect of the present disclosure, a steering system for a vehicle includes: an operation member operable by a driver; a front-wheel steering device to which the operation member is connected to enable a front wheel to be steered by a steering amount corresponding to an operation amount of the operation member, the front-wheel steering device including a drive source to apply a steering force to the front wheel; a rear-wheel steering device configured to steer a rear wheel independently of the front wheel; and a controller configured to control the front-wheel steering device and the rear-wheel steering device. The controller is configured to execute a front-wheel steering force application control to apply, to the front wheel, the steering force that includes, as a component thereof, a driving support force that causes the vehicle to travel along a target travel line. The controller is configured to determine, in the front-wheel steering force application control, the driving support force based on (a) a target operation amount that is the operation amount of the operation member to cause the vehicle to travel along the target travel line and (b) a steering amount of the rear wheel.

The control for causing the vehicle to travel along the target travel line is referred to as what is called line trace control, lane keeping control or the like (hereinafter referred to as "line trace control or the like" where appropriate). The driving support force is the steering force applied to the front wheel by the line trace control or the like. The vehicle steering system of the present disclosure (hereinafter referred to as "present steering system" or "present system" where appropriate) can be referred to as a four wheel steering system in a case where the vehicle has two front wheels and two rear wheels. In the present system, the steering force applied to the front wheel is determined also based on the steering amount of the rear wheel, thus enabling a good line trace behavior.

Various Forms

The "operation member" in the present system is typically a steering wheel but may be a joystick, for instance. When the operation member is the steering wheel, an operation angle of the operation member from the neutral position may be employed as the "operation amount" of the operation member. The "steering amount" of the wheel is generally a toe angle of the wheel, i.e., a turning angle of the wheel from the neutral position. The "steering amount" of the wheel may be a moving amount of a member, such as a rack bar, that moves in connection with steering of the wheel. Further, when the steering device includes the drive source for steering the wheel, such as an electric motor, the "steering amount" of the wheel may be an operation amount of the drive source, e.g., a rotational amount of the electric motor.

There may be employed, as the "front-wheel steering device" in the present system, a steering device of what is called power steering system. The drive source that applies the steering force is an electric motor, a hydraulic cylinder or the like. If the steering force applied to the front wheel is considered as a force to rotate the wheel about the kingpin axis, the steering force can be generally referred to as a steering torque. The steering force may act on a steering rod (rack bar) connecting right and left front wheels as a force to move the steering rod rightward and leftward. Further, the steering force may act, as a rotational force, on a steering shaft to which the steering wheel is attached.

The "rear-wheel steering device" in the present system is not mechanically connected to the front-wheel steering device. The rear-wheel steering device steers the rear wheel independently of the front wheel. When the vehicle is a four-wheeled vehicle, the rear-wheel steering device may steer the rear right and left wheels together or independently of each other. In the latter case, it can be considered that the two rear-wheel steering devices function as one rear-wheel steering device. The rear-wheel steering device may include a drive source to steer the rear wheel.

The "controller" in the present system may be constituted mainly by a computer including a CPU, a ROM, a RAM, etc., and include drivers of the drive sources of the front-wheel steering device and the rear-wheel steering device. The controller in the present system may be a single controller. Alternatively, a plurality of controllers that individually control the front-wheel steering device and the rear-wheel steering device may function integrally.

The "front-wheel steering force application control" is a control for applying the steering force to the front wheel. In the present system, the steering force including the "driving support force" as a component thereof is applied to the front wheel by the front-wheel steering force application control. The driving support force is a steering force component for causing the vehicle to travel along the target travel line. As the "target travel line", there may be employed a virtual line located at the middle between right-side and left-side road lane markers drawn on the road surface on which the vehicle travels. From the viewpoint of not causing the vehicle to drive out of the own lane, the target travel line may have a certain degree of width. The target travel line is set based on image data obtained by a camera that monitors the front of the vehicle, for instance. The target travel line may be set by the controller of the present system or may be transmitted, as data, from a controller of an automated driving system. The "target operation amount" may be determined based on the target travel line.

Here, a force applied by the driver to the operation member is referred to as the operation force. The steering force in the front-wheel steering force application control in the present system may include, as a component of the steering force, the operation assist force that assists the operation force, in addition to the driving support force. When the operation member is the steering wheel, the operation force is considered as the operation torque, and the operation assist force is considered as the operation assist torque. Like the assist force in typical power steering systems, the operation assist force may be a force having a magnitude based on the operation force. Specifically, the operation assist force may be set such the greater the operation force, the greater the operation assist force. By applying the steering force that includes, as components thereof, both the driving support force and the operation assist force to the front wheel, an appropriate steering force is applied to the front wheel even when the driver's operation force is applied to the operation member in the midst of application of the driving support force. It is noted that the operation force can be obtained by providing an operation force sensor.

In the rear-wheel steering control of the present system, which is a control of the rear-wheel steering device, the steering amount of the rear wheel may be determined as a target steering amount based on the operation amount of the operation member, and the rear-wheel steering device may be controlled such that the steering amount of the rear wheel actually detected becomes equal to the target steering amount.

When the driving support force is determined based on the target operation amount and the steering amount of the rear wheel in the front-wheel steering force application control, the steering amount of the rear wheel may be the steering amount actually detected or may be the steering amount estimated from the target operation amount. The steering amount actually detected (hereinafter referred to as "actual steering amount" where appropriate) may be a value obtained from a steering amount sensor or from an operation amount of the drive source to steer the rear wheel. The steering amount estimated from the target operation amount (hereinafter referred to as "estimated steering amount" where appropriate) can be obtained by estimation according to a process of determining the target steering amount of the rear wheel. There is a possibility that the actual steering amount is somewhat delayed with respect to the estimated steering amount. The delay is relatively large if the driver operates the operation member with a relatively large operation force when the driving support force is being applied. In terms of a good line trace behavior described above, the estimated steering amount of the rear wheel is preferably employed.

Though a process of determining the driving support force is not limited to particular one, the driving support force may be determined based on, for instance, a yaw rate of the vehicle or lateral acceleration of the vehicle estimated based on a linear two-wheel model. This process will be later explained in detail.

In determining the driving support force, the driving support force including the feedforward component and the feedback component may be determined. In this case, the feedforward component may be determined based on the target operation amount and the steering amount of the rear wheel, and the feedback component may be determined based on a deviation of the actual operation amount with respect to the target operation amount. The determination of the driving support force including the feedback component enables execution of more appropriate front-wheel steering force application control.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DESCRIPTION

Figure 1:
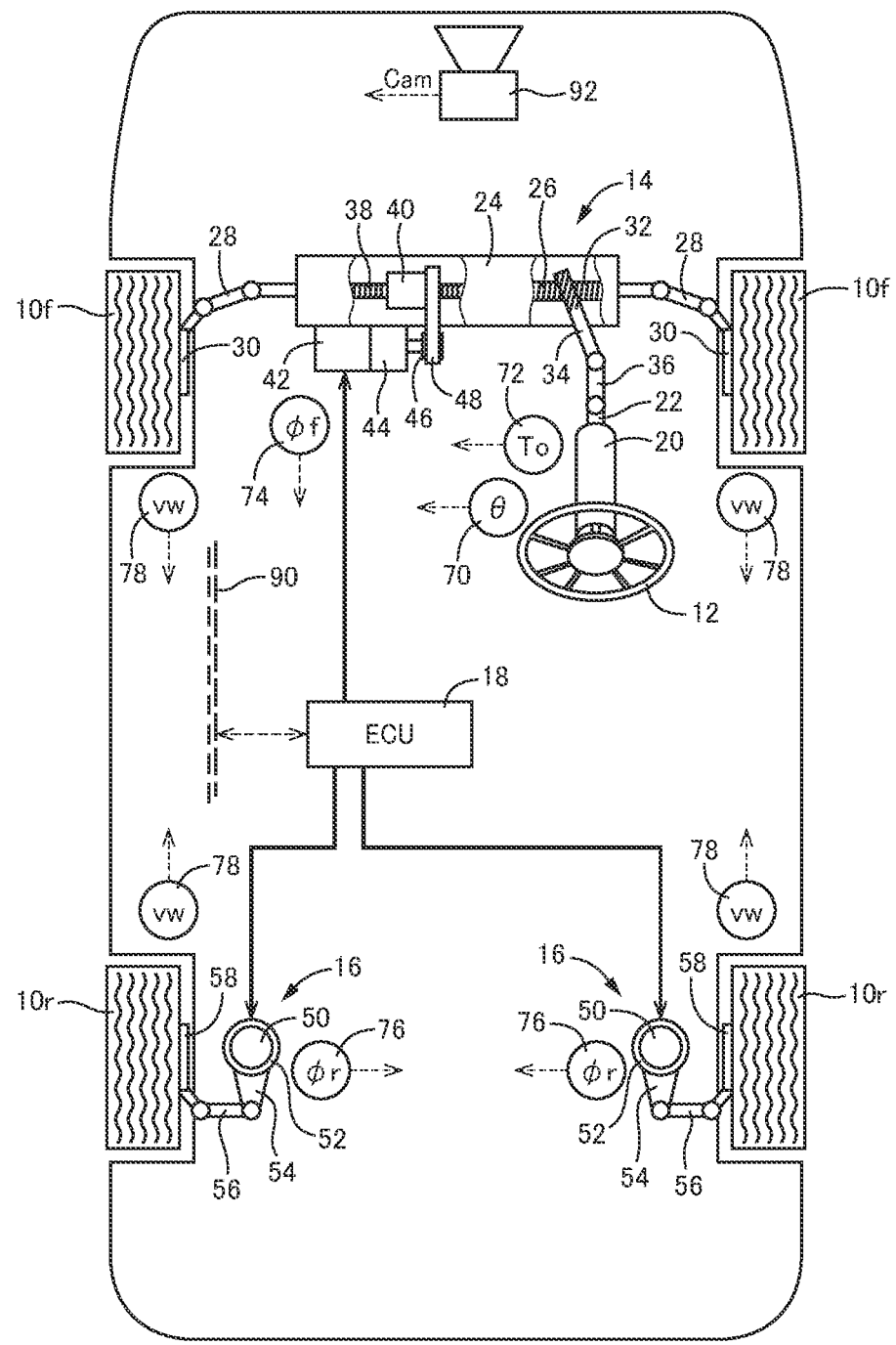
FIG. 1 is a view schematically illustrating a hardware configuration of a steering system of a vehicle according to one embodiment of the present disclosure.

Referring to the drawings, there will be described below in detail a steering system for a vehicle according to one embodiment of the present disclosure. It is to be understood that the present disclosure is not limited to the details of the following embodiment but may be embodied based on the forms described above in Various Forms and may be changed and modified based on the knowledge of those skilled in the art.

A. Hardware Configuration of Steering System for Vehicle

As illustrated in FIG. 1, a steering system for a vehicle according to the present embodiment is installed on a vehicle having front right and left wheels 10$f$ and rear right and left wheels 10$r$. The steering system includes: a steering wheel 12 operable by a driver and functioning as an operation member; a front-wheel steering actuator 14 for steering the front right and left wheels 10$f$ together; two rear-wheel steering actuators 16 that steer the rear right and left wheels 10$r$ independently of each other and independently of the two front wheels 10$f$; and a steering electronic control unit (hereinafter referred to as "steering ECU" where appropriate) 18 configured to control the front-wheel steering actuator 14 and the rear-wheel steering actuators 16. The steering ECU 18 functions as a controller. The front-wheel steering actuator 14 can be considered as a front-wheel steering device. Each of the two rear-wheel steering actuators 16 can be considered as a rear-wheel steering device. Further, it can be considered that the two rear-wheel steering actuators 16 constitute one rear-wheel steering device. Where it is not necessary to distinguish the front wheel 10f and the rear wheel 10r from each other, a general term "wheel 10" will be used to refer to the front wheel 10f and the rear wheel 10r.

The steering wheel 12 is rotatably held by a steering column 20 fixed to an instrument panel reinforcement. Specifically, the steering wheel 12 is attached to an upper end of a steering shaft 22 that is rotatably held in the steering column 20.

The front-wheel steering actuator 14 includes a housing 24 fixed to a body of the vehicle and a steering rod 26 held in the housing 24 so as to be unrotatable and movable in the right-left direction. The steering rod 26 is connected at right and left ends thereof respectively to right and left steering knuckles 30 that rotatably hold the front right and left wheels 10f via respective link rods 28. A rack 32 is formed on the steering rod 26. A pinion shaft 34 is rotatably held by the housing 24 in a state in which the pinion shaft 34 is in mesh with the rack 32. The pinion shaft 34 is connected at its upper end to a lower end of the steering shaft 22 via an intermediate shaft 36. In this configuration, when the driver operates the steering wheel 12, the front wheels 10f are steered by a steering amount corresponding to an operation angle (as one kind of an operation amount) of the steering wheel 12.

In the front-wheel steering actuator 14, a threaded groove 38 is formed on the steering rod 26. A nut 40 holding bearing balls is threadedly engaged with the threaded groove 38 so as to be rotatable and immovable in the axial direction. That is, the steering rod 26 and the nut 40 constitute a ball screw mechanism. A front-wheel steering motor 42, which is an electric motor and a drive source of the front-wheel steering actuator 14, is attached to the housing 24. A speed reducer 44 is connected to the front-wheel steering motor 42, which rotates a pulley 46 via the speed reducer 44. A timing belt 48 is looped over the pulley 46 and the nut 40. By rotating the front-wheel steering motor 42, the nut 40 rotates so as to cause the steering rod 26 to move in the right-left direction. That is, a torque for steering the front wheels 10f, namely, a front-wheel steering torque as one kind of the steering force, is applied to the front wheels 10f by a front-wheel steering motor torque, which is a torque generated by the front-wheel steering motor 42.

Each rear-wheel steering actuator 16 includes a rear-wheel steering motor 50, which is a drive source and an electric motor, a speed reducer 52 connected to the rear-wheel steering motor 50, and a steering lever 54 connected to an output shaft of the speed reducer 52. The steering lever 54 is connected, via a link rod 56, to a steering knuckle 58 that rotatably holds the rear wheel 10r. By rotating the rear-wheel steering motors 50, the rear wheels 10r are steered independently of the front wheels 10f.

The steering ECU 18 includes, as a main constituent element, a computer including a CPU, a ROM, a RAM, etc., and includes drive circuits (drivers) of the front-wheel steering motor 42 and the rear-wheel steering motors 50. Each of the front-wheel steering motor 42 and the rear-wheel steering motors 50 is a brushless DC motor, and each drive circuit is an inverter.

In addition, the vehicle is provided with: an operation angle sensor 70 for detecting an operation angle θ of the steering wheel 12, which is the operation amount of the operation member; an operation torque sensor 72 for detecting an operation torque (as one kind of the operation force) To, which is a torque applied by the driver to the steering wheel 12; a front-wheel motor rotational angle sensor 74 for detecting a motor rotational angle (rotational phase) of of the front-wheel steering motor 42; and rear-wheel motor rotational angle sensors 76 each for detecting a motor rotational angle (rotational phase) φr of the corresponding rear-wheel steering motor 50. Signals from those sensors 70, 72, 74, 76 are input to the steering ECU 18 through a CAN (car area network or controllable area network) 90 of the vehicle. Further, the vehicle is provided with wheel speed sensors 78 each for detecting a wheel speed vw, which is a rotational speed of the corresponding wheel 10. The wheel speed sensors 78 are also connected to the CAN 90. Signals from the wheel speed sensors 78 are transmitted to a brake electronic control unit (not illustrated). Based on the signals, the brake electronic control unit estimates a vehicle speed v, which is a traveling speed of the vehicle. Signals relating to the estimated vehicle speed v are received by the steering ECU 18 via the CAN 90. The vehicle further includes a monitoring camera 92 for monitoring the front of the vehicle. Image data obtained by the monitoring camera 92 is also input to the steering ECU 18 via the CAN 90.

B. Controls Executed in Steering System for Vehicle

In the vehicle steering system, a rear-wheel steering control for steering the rear wheels and a front-wheel steering torque application control (as one kind of a front-wheel steering force application control) for applying the steering torque (as one kind of the steering force) to the front wheels are executed. The controls will be hereinafter described. Specifically, the rear-wheel steering control is for controlling a current supplied to the rear-wheel steering motors, each of which is the drive source of the corresponding rear-wheel steering actuator 16. The front-wheel steering torque application control is for controlling a current supplied to the front-wheel steering motor, which is the drive source of the front-wheel steering actuator 14.

a. Functional Configuration of Controller Relating to Controls

Figure 2:
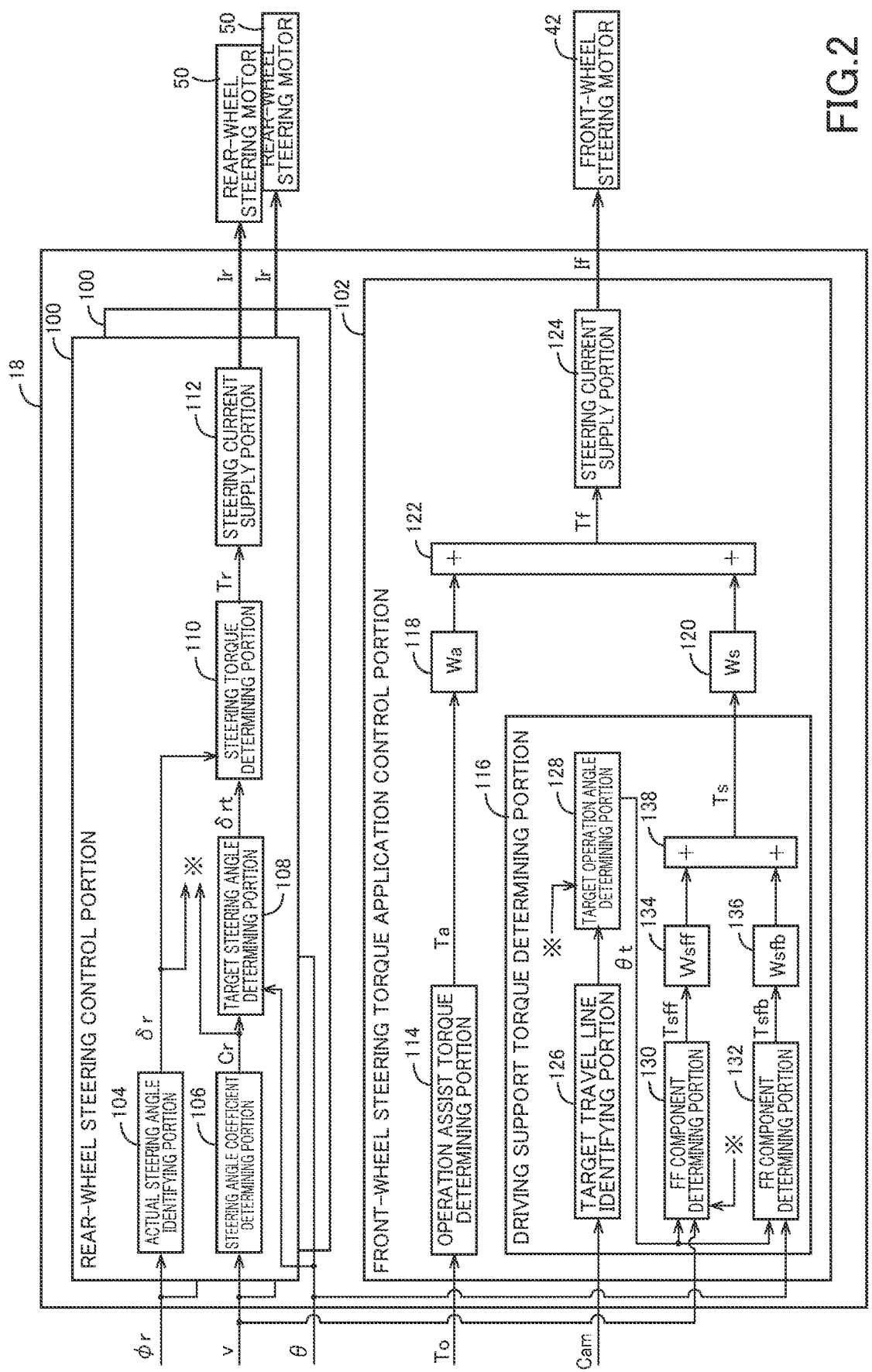
FIG. 2 is a block diagram illustrating functions of a controller of the steering system according to the embodiment.

The rear-wheel steering control and the front-wheel steering torque application control are executed by the steering ECU 18, which functions as the controller. It can be considered that the steering ECU 18 includes a functional configuration illustrated by a block diagram of FIG. 2 to execute the controls. Each block in FIG. 2 is a functional portion effectuated by processing executed by the steering ECU 18, namely, each block is a functional portion. As illustrated in FIG. 2, the steering ECU 18 includes two rear-wheel steering control portions 100 corresponding to the rear-wheel steering controls executed for the two rear wheels 10r and a front-wheel steering torque application control portion 102 corresponding to the front-wheel steering torque application control.

Each rear-wheel steering control portion 100 includes: an actual steering angle identifying portion 104 that identifies an actual rear-wheel steering angle (as one kind of the steering amount of the rear wheel) δr based on a motor rotational angle φr of the corresponding rear-wheel steering motor 50; a steering angle coefficient determining portion 106 that determines a rear-wheel steering angle coefficient Cr, which is a coefficient for determining a target rear-wheel steering angle δrt, which is a target of the rear-wheel steering angle δr; a target steering angle determining portion 108 that determines a target rear-wheel steering angle δrt based on the rear-wheel steering angle coefficient Cr and the operation angle θ of the steering wheel 12; a steering torque determining portion 110 that determines a rear-wheel steering torque (as one kind of the rear-wheel steering force) Tr based on the target rear-wheel steering angle δrt and the actual rear-wheel steering angle δr; and a steering current supply portion 112 that supplies a rear-wheel steering current Ir to the corresponding rear-wheel steering motor 50 based on the rear-wheel steering torque Tr.

The front-wheel steering torque application control portion 102 includes: an operation assist torque determining portion 114 that determines an operation assist torque Ta, which is the steering torque applied to the front wheels 10f for assisting the driver's operation of the steering wheel 12, such that the operation assist torque Ta has a magnitude based on the operation torque To applied by the driver to the steering wheel 12; and a driving support torque determining portion 116 that determines a driving support torque (as one kind of the driving support force) Ts, which is the steering torque applied to the front wheels 10f for causing the vehicle to travel along the target travel line.

Each of the operation assist torque Ta and the driving support torque Ts is one component of the front-wheel steering torque Tf applied to the front wheels 10f. For determining the front-wheel steering torque Tf based on the operation assist torque Ta and the driving support torque Ts, the front-wheel steering torque application control portion 102 includes a multiplier 118 that multiplies the operation assist torque Ta by an operation assist torque weighting coefficient Wa, a multiplier 120 that multiplies the driving support torque Ts by a driving support torque weighting coefficient Ws, and an adder 122 that adds the operation assist torque Ta multiplied by the coefficient Wa and the driving support torque Ts multiplied by the coefficient Ws. The front-wheel steering torque application control portion 102 further includes a steering current supply portion 124 that supplies a front-wheel steering current If to the front-wheel steering motor 42 based on the front-wheel steering torque Tf determined by the addition described above.

For generating the driving support torque Ts, the driving support torque determining portion 116 includes: a target travel line identifying portion 126 that identifies a target travel line based on the image data Cam obtained by the monitoring camera 92; and a target operation angle determining portion 128 that determines, based on the identified target travel line, a target operation angle (as one kind of the target operation amount) θt, which is the operation angle θ of the steering wheel 12 for causing the vehicle to travel along the target travel line. The driving support torque Ts includes a feedforward component Tsff and a feedback component Tsfb. The driving support torque determining portion 116 includes: an FF component determining portion 130 that determines the component Tsff; an FB component determining portion 132 that determines the component Tsfb; a multiplier 134 that multiplies the feedforward component Tsff by a feedforward component weighting coefficient Wsff; a multiplier 136 that multiplies the feedback component Tsfb by a feedback component weighting coefficient Wsfb; and an adder 138 that adds the feedforward component Tsff multiplied by the coefficient Wsff and the feedback component Tsfb multiplied by the coefficient Wsfb.

b. Description of Rear-Wheel Steering Control and Front-Wheel Steering Torque Application Control There will be next described the rear-wheel steering control and the front-wheel steering torque application control while describing processing in each functional portion described above.

i) Rear-Wheel Steering Control

In the rear-wheel steering control executed for each of the rear right and left wheels 10r, the actual steering angle identifying portion 104 identifies the actual rear-wheel steering angle θr. The actual rear-wheel steering angle θr, i.e., the turning angle of the rear wheel 10r when the neutral position (that is an angular position of the wheel when the vehicle travels straight) is defined as 0, and the rear-wheel motor rotational angle φr, which is the motor rotational angle of the rear-wheel steering motor 50, have a relationship to satisfy a predetermined gear ratio specified based on the structure of the speed reducer 52, for instance. The actual steering angle identifying portion 104 identifies the actual rear-wheel steering angle δr based on the gear ratio and the rear-wheel motor rotational angle φr detected by the rear-wheel motor rotational angle sensor 76.

Figure 3A:
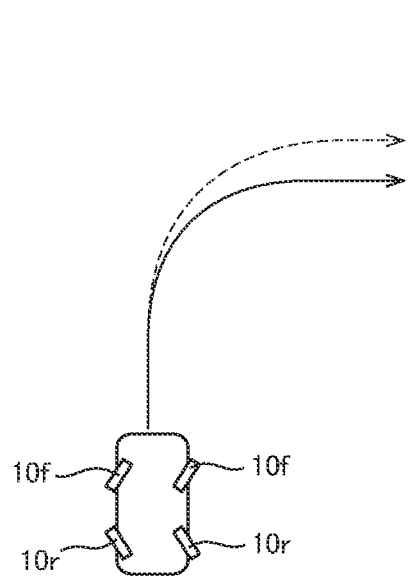
FIG. 3A illustrates a state in which a rear wheel is steered in a phase opposite to a front wheel.
Figure 3B:
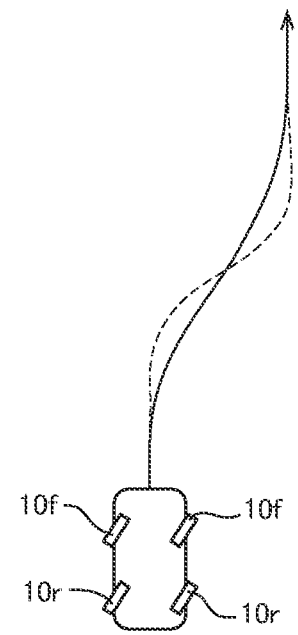
FIG. 3B illustrates a state in which the rear wheel is steered in the same phase as the front wheel.

In the present steering system, each rear wheel 10r is steered in accordance with the operation angle θ of the steering wheel 12. When the vehicle speed v is low, the rear wheel 10r is steered in a direction opposite to the front wheel 10f, namely, in an opposite phase, as illustrated in FIG. 3A. When the vehicle speed v becomes high to a certain extent, the rear wheel 10r is steered in the same direction as the front wheel 10f, namely, in the same phase, as illustrated in FIG. 3B. In FIGS. 3A and 3B, the travel line of the vehicle when the rear wheel 10r is not steered is indicated by the dashed line, and the travel line of the vehicle when the rear wheel 10r is steered is indicated by the solid line though illustrated somewhat extremely. As apparent from FIG. 3A, when the rear wheels 10r are steered in the opposite phase to the front wheels 10f, the vehicle can make a small turn with a small turning radius, thus resulting in good maneuverability of the vehicle. Further, as apparent from FIG. 3B, when the rear wheels 10r are steered in the same phase as the front wheels 10f, the traveling behavior of the vehicle can be stabilized in lane changing, for instance.

The present steering system utilizes the rear-wheel steering angle coefficient Cr. The target steering angle determining portion 108 determines the target rear-wheel steering angle δrt according to the following expression based on the operation angle (the actual operation angle) θ of the steering wheel 12 detected by the operation angle sensor 70.

$$\delta rt = C_r \cdot \theta \tag{1}$$

Figure 3C:
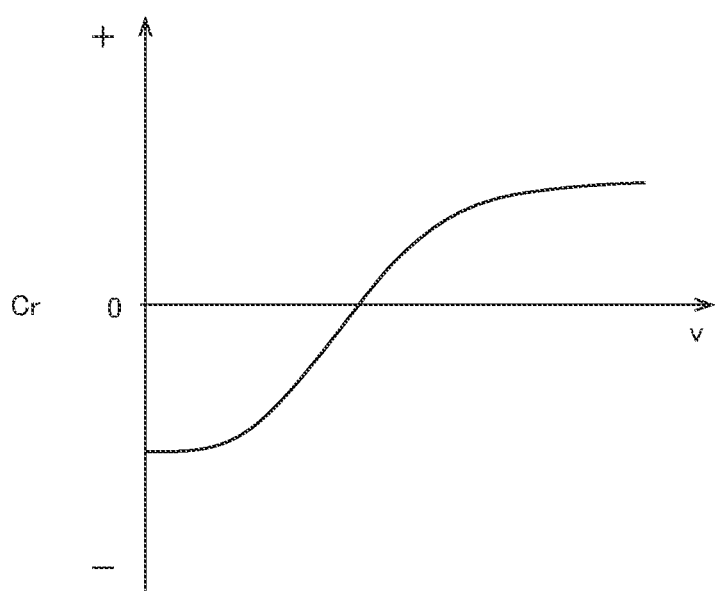
FIG. 3C is a graph indicating a coefficient utilized for determining a steering amount of the rear wheel.

The steering ECU 18 stores map data illustrated in graph format of FIG. 3C. The steering angle coefficient determining portion 106 determines the rear-wheel steering angle coefficient Cr based on the vehicle speed v of the vehicle referring to the map data. It is noted that the rear-wheel steering angle coefficient Cr is positive (+) when the rear wheel 10r is steered in the same phase as the front wheel 10f and negative (−) when the rear wheel 10r is steered in the opposite phase to the front wheel 10f.

The steering torque determining portion 110 determines the rear-wheel steering torque Tr based on a rear-wheel steering angle deviation Δδr (=δrt−δr), which is a deviation of the actual rear-wheel steering angle δr with respect to the target rear-wheel steering angle δrt, according to the PID feedback control technique, specifically, according to the following expression.

$$Tr = Grp \cdot \Delta \delta r + Gri \cdot \int (\Delta \delta r) dt + Grd \cdot d(\Delta \delta r)/dt \tag{2}$$

In the above expression, "Grp", "Gri", and "Grd" represent a proportional term gain, an integral term gain, and a derivative term gain, respectively.

The steering current supply portion 112 is a functional portion constituted by an inverter as a main constituent element. The rear-wheel steering torque Tr supplied to the rear wheel 10r is substantially proportional to the rear-wheel steering current Ir supplied to the rear-wheel steering motor 50. Thus, based on the rear-wheel steering torque Tr determined as described above, the steering current supply portion 112 supplies, to the rear-wheel steering motor 50, the rear-wheel steering current Ir by an amount corresponding to the torque Tr.

ii) Front-Wheel Steering Torque Application Control

As described above, the front-wheel steering torque Tf includes the operation assist torque Ta and the driving support torque Ts each as the component. The operation assist torque determining portion 114 determines the operation assist torque Ta, and the driving support torque determining portion 116 determines the driving support torque Ts.

The operation assist torque determining portion 114 determines the operation assist torque Ta for applying the assist torque as in typical power steering devices. Specifically, the operation assist torque determining portion 114 determines the operation assist torque Ta based on the operation torque To detected by the operation torque sensor 72 so as to enable a torque, which increases with an increase in the operation torque To, to be applied to the front wheel 10f in a direction to decrease the operation torque To. Specifically, the operation assist torque Ta is determined according to the following expression.

$$Ta = Cta \cdot To \quad (3)$$

In the above expression, "Cta" represents an operation assist torque conversion coefficient.

Figure 4A:
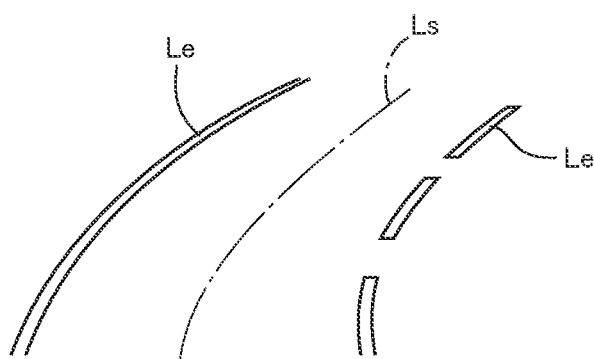
FIG. 4A illustrates a concept of a target travel line.

As described above, the driving support torque Ts is a torque for causing the vehicle to travel along the target travel line. The target travel line is identified by the target travel line identifying portion 126 of the driving support torque determining portion 116. Specifically, the monitoring camera 92 obtains an image of the front of the own vehicle (the forward image) as schematically illustrated in FIG. 4A, and the image data Cam of the obtained image is transmitted to the target travel line identifying portion 126. Based on the image data Cam, the target travel line identifying portion 126 identifies the target travel line Ls. The target travel line Ls is identified according to an ordinary technique, a description of which is briefly made here. The target travel line identifying portion 126 identifies right-side and left-side lane markers Le that demarcate a travel lane of the own vehicle (hereinafter referred to as "own lane" where appropriate) and identifies, as the target travel line Ls, a line middle between the lane markers Le, namely, a line that bisects the own lane in the right-left direction.

The target operation angle determining portion 128 of the driving support torque determining portion 116 determines the target operation angle θt based on the target travel line Ls identified as described above and the actual rear-wheel steering angle δr. The target operation angle θt may be determined according to a known technique, a detailed description of which is dispensed with here.

Figure 4B:
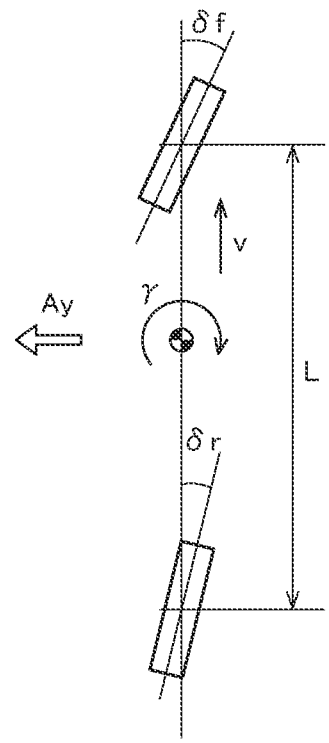
FIG. 4B is a view of a linear two-wheel model relating to steering of the front and rear wheels.

The driving support torque Ts includes the feedforward component (hereinafter referred to as "FF component" where appropriate) Tsff and the feedback component (hereinafter referred to as "FB component" where appropriate) Tsfb. The FF component determining portion 130 determines the FF component Tsff according to a linear two-wheel model illustrated in FIG. 4B. The technique of determining the FF component Tsff utilizing the model will be hereinafter described in detail.

In short, the FF component determining portion 130 determines the FF component Tsff according to the following expression.

$$Tsff = Cts \cdot Gv \cdot Ay \quad (4)$$

Figure 4C:
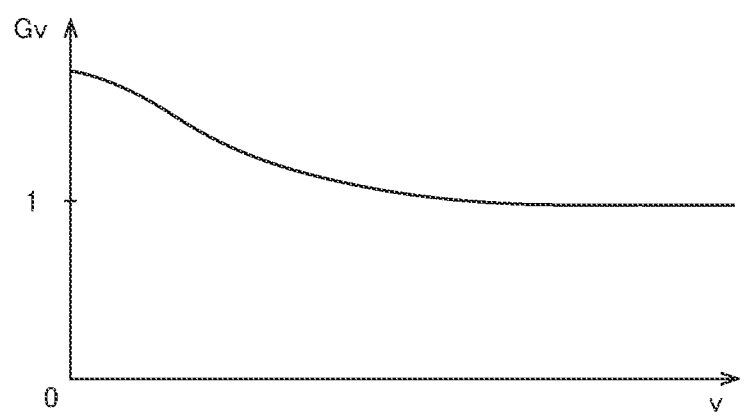
FIG. 4C is a graph indicating a coefficient utilized for determining a driving support force.

In the above expression, "Cts", "Gv", and "Ay" represent a driving support torque conversion coefficient, a vehicle speed gain, and lateral acceleration generated in the vehicle. The driving support torque conversion coefficient Cts is a constant. The vehicle speed gain Gv is set such that the higher the vehicle speed v, the smaller the vehicle speed gain Gv as illustrated in a graph of FIG. 4C, in consideration of the traveling stability of the vehicle, for instance.

According to the linear two-wheel model, a yaw rate γ of the vehicle is represented by the following expression where a front-wheel steering angle, which is the steering angle of the front wheel, is δf, the rear-wheel steering angle is δr, a wheelbase is L, and a stability factor is Kh.

$$\gamma = v \cdot \delta f / ((1 + Kh \cdot v^2) \cdot L) - v \cdot \delta r / ((1 + Kh \cdot v^2) \cdot L) \quad (5)$$

The lateral acceleration Ay can be represented by the following expression.

$$Ay = v \cdot \gamma \quad (6)$$

The FF component Tsff can be obtained according to the following expression by utilizing a steering gear ratio Ns (=δf/θ), which is a ratio of the front-wheel steering angle δf with respect to the operation angle θ, and an operator Z=(1+Kh·v²)·L and employing the target operation angle θt as the operation angle θ.

$$Tsff = Cts \cdot Gv \cdot (v^2 \cdot (\theta t/Ns)/Z - v^2 \cdot \delta r/Z) \quad (7)$$

The steering gear ratio Ns is a constant specified by the structure of the front-wheel steering actuator 14, and the wheel base L is a constant specified by the structure of the vehicle.

According to the expression (7), the FF component Tsff is determined such that the greater the target operation angle θt, the greater the FF component Tsff. In the case where the rear wheel 10r is steered in the same phase as the front wheel 10f, the FF component Tsff is determined such that the greater the rear-wheel steering angle δr, the smaller the FF component Tsff. In the case where the rear wheel 10r is steered in the opposite phase to the front wheel 10f, the FF component Tsff is determined such that the greater the rear-wheel steering angle δr, the greater the FF component Tsff.

The FF component determining portion 130 determines the FF component Tsff according to the expression (7) based on the vehicle speed v obtained by the steering ECU 18, the target operation angle θt determined by the target operation angle determining portion 128, and the actual rear-wheel steering angle θr identified by the actual steering angle identifying portion 104.

The FF component determining portion 130 may determine the FF component Tsff without utilizing the actual rear-wheel steering angle δr. That is, the FF component Tsff can be determined utilizing, in place of the actual rear-wheel steering angle δr, the rear-wheel steering angle δr estimated from the target operation angle θt based on the rear-wheel steering angle coefficient Cr determined by the steering angle coefficient determining portion 106. Specifically, the FF component Tsff may be determined according to the following expression.

$$Tsff = Cts \cdot Gv \cdot (v^2 \cdot (\theta t/Ns)/Z - v^2 \cdot \theta t \cdot Cr/Z) \quad (8)$$
$$= Cts \cdot Gv \cdot v^2 \cdot (\theta t/Ns) \cdot (1 - Ns \cdot Cr)/Z$$

Further, the FF component determining portion 130 may determine the FF component Tsff according to the following expression, in place of the expression (8).

$$Tsff = Cts \cdot Gv \cdot v^2 \cdot (\theta t/Ns) \cdot (1 - Ns \cdot (\delta r/\theta t))/Z \quad (9)$$

The FB component determining portion 132 determines the FB component Tsfb according to the PID feedback control technique based on an operation angle deviation Δθ (=θt−θ), which is a deviation of the actual operation angle θ of the steering wheel 12 detected by the operation angle sensor 70 with respect to the target operation angle θt determined by the target operation angle determining portion 128. Specifically, the FB component Tsfb is determined according to the following expression.

$$Tsfb = Gtsp \cdot \Delta\theta + Gtsi \cdot \int (\Delta\theta) dt + Gtsd \cdot (\Delta\delta\theta/dt) \quad (10)$$

In the expression (10), "Gtsp", "Gtsi", and "Gtsd" are a proportional term gain, an integral term gain, and a derivative term gain, respectively.

The multiplier 134 multiplies the determined FF component Tsff by the feedforward component weighting coefficient Wsff, and the multiplier 136 multiplies the determined FB component Tsfb by the feedback component weighting coefficient Wsfb. The adder 138 adds the FF component Tsff multiplied by the coefficient Wsff and the FB component Tsfb multiplied by the coefficient Wsfb, so that the driving support torque Ts is determined. That is, the driving support torque Ts is determined according to the following expression.

$$Ts = Wsff \cdot Tsff + Wsfb \cdot Tsfb \quad (11)$$

The multiplier 118 multiplies the operation assist torque Ta determined by the operation assist torque determining portion 114 by the operation assist torque weighting coefficient Wa. The multiplier 120 multiplies the driving support torque Ts determined by the driving support torque determining portion 116 by the driving support torque weighting coefficient Ws. The adder 122 adds the operation assist torque Ta multiplied by the coefficient Wa and the driving support torque Ts multiplied by the coefficient Ws, so that the rear-wheel steering torque Tr is determined.

The operation assist torque Ta and the driving support torque Ts are components of the front-wheel steering torque Tf having mutually different aims. Thus, the operation assist torque weighting coefficient Wa and the driving support torque weighting coefficient Ws are gradually set such that adjustment between the operation assist torque Ta and the driving support torque Ts is performed. For instance, though not described in detail, the driving support torque weighting coefficient Ws is made relatively small if the driver operates the steering wheel 12 by a relatively large amount in the midst of traveling of the vehicle along the target travel line by the driving support torque Ts. Further, the operation assist torque weighting coefficient Wa and the driving support torque weighting coefficient Ws are gradually changed for preventing the front-wheel steering torque Tf being applied to the front wheel 10f from abruptly changing in such adjustment.

The steering current supply portion 124 is a functional portion constituted by an inverter as a main constituent element. The front-wheel steering torque Tf applied to the front wheel 10f is generally proportional to the front-wheel steering current If, which is a current supplied to the front-wheel steering motor 42. Thus, based on the determined front-wheel steering torque Tf, the steering current supply portion 124 supplies, to the front-wheel steering motor 42, the front-wheel steering current If whose amount corresponds to the torque Tf.

iii) Significance of Feedforward Component in Front-Wheel Steering Torque Application Control In the present steering system, the FF component Tsff of the driving support torque Ts is determined according to any one of the expressions (7), (8), and (9). That is, whichever expression is used, the FF component Tsff is determined based on not only the target operation angle θt determined based on the target travel line Ls but also the rear-wheel steering angle δr.

Figure 5:
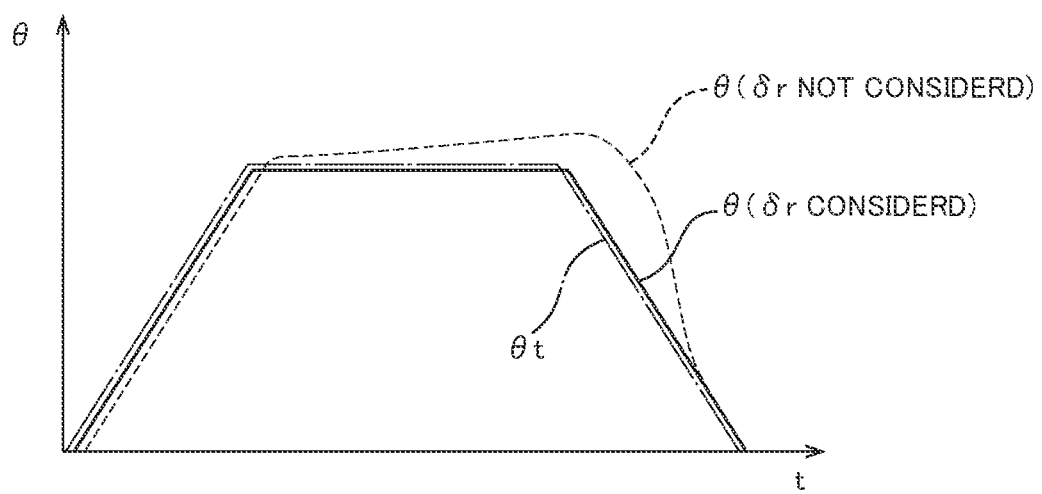
FIG. 5 is a graph for explaining a significance of determining the driving support force in consideration of the steering amount of the rear wheel.

Here, there is considered driving support in a case where the rear wheel 10r is steered in the same phase as the front wheel 10f in the present steering system, for instance. FIG. 5 indicates how the actual operation angle θ changes by the driving support torque Ts with respect to a change in the target operation angle θt with a lapse of time t. In a case where the FF component Tsff is determined without taking the rear-wheel steering angle δr into consideration when the target operation angle θt changes as indicated by the long dashed short dashed line, the actual operation angle θ changes as indicated by the dashed line. That is, the FF component Tsff is excessive, so that the actual operation angle θ overshoots the target operation angle θt. In contrast, in a case where the rear-wheel steering angle δr is taken into consideration, namely, in a case where the FF component Tsff is determined also based on the rear-wheel steering angle δr as described above, the actual operation angle θ changes so as to generally coincide with the target operation angle θt as indicated by the solid line. In short, by determining the driving support torque Ts with consideration given to the rear-wheel steering angle δr in the present steering system, the vehicle on which the present steering system is installed attains a good line trace behavior.

According to the expression (7), the FF component Tsff is determined based on the actual rear-wheel steering angle δr, thus facilitating determination of the FF component Tsff without utilizing the rear-wheel steering angle coefficient Cr. In this case, however, a delay is generated in the steering motion of the rear wheel 10r, and the influence of the delay is reflected in the FF component Tsff to be determined. According to the expression (8), in contrast, the FF component Tsff is determined not based on the actual rear-wheel steering angle δr but based on the rear-wheel steering angle δr estimated from the target operation angle θt, so that the actual operation angle θ coincides with the target operation angle θt more appropriately. The determination of the FF component Tsff according to the expression (9) offers results similar to those in the determination according to the expression (7). In this case, however, the FF component Tsff tends to be excessive when the vehicle is in a nearly straight traveling state, namely, when the target operation angle θt is considerably small. Further, it is desirable to take measures, in the determination of the FF component Tsff, against a situation in which the target operation angle θt is totally 0.

What is claimed is:

1. A steering system for a vehicle, comprising:
   an operation member operable by a driver;
   a front-wheel steering device to which the operation member is connected to enable a front wheel to be steered by a steering amount corresponding to an operation amount of the operation member, the front-wheel steering device including a drive source to apply a steering force to the front wheel;
   a rear-wheel steering device configured to steer a rear wheel independently of the front wheel; and
   a controller configured to control the front-wheel steering device and the rear-wheel steering device,
   wherein the controller is configured to execute a front-wheel steering force application control to apply, to the front wheel, the steering force that includes, as a component thereof, a driving support force that causes the vehicle to travel along a target travel line, by controlling the front-wheel steering device, and
   wherein the controller is configured to determine, in the front-wheel steering force application control, the driving support force based on (a) a target operation amount that is the operation amount of the operation member to cause the vehicle to travel along the target travel line and (b) an actual steering amount of the rear wheel or a steering amount of the rear wheel estimated from the target operation amount.

2. The steering system according to claim 1, wherein the front-wheel steering force application control is a control to apply, to the front wheel, the steering force that includes the driving support force and an operation assist force having a magnitude based on an operation force that the driver applies to the operation member.

3. The steering system according to claim 1, wherein the controller is configured to execute a rear-wheel steering control in which the controller determines the steering amount of the rear wheel based on the operation amount of the operation member and controls the rear-wheel steering device so as to steer the rear wheel by the determined steering amount.

4. The steering system according to claim 1, wherein the controller is configured to determine, in the front-wheel steering force application control, the driving support force based on the target operation amount and the steering amount of the rear wheel actually detected.

5. The steering system according to claim 1, wherein the controller is configured to determine, in the front-wheel steering force application control, the driving support force based on the target operation amount and the steering amount of the rear wheel estimated from the target operation amount.

6. The steering system according to claim 1, wherein the controller is configured to determine, in the front-wheel steering force application control, the driving support force based on a yaw rate or lateral acceleration of the vehicle estimated based on a linear two-wheel model.

7. The steering system according to claim 1, wherein the controller is configured to determine, in the front-wheel steering force application control, a feedforward component based on the target operation amount and the steering amount of the rear wheel and a feedback component based on a deviation of an actual operation amount with respect to the target operation amount, so as to determine the driving support force that includes the feedforward component and the feedback component.

* * * * *